US008812936B2

(12) United States Patent  
Blaunstein

(10) Patent No.: US 8,812,936 B2  
(45) Date of Patent: Aug. 19, 2014

(54) USING SLOW RESPONSE MEMORY DEVICE ON A FAST RESPONSE INTERFACE

(75) Inventor: Mordechai Blaunstein, Sunnyvale, CA (US)

(73) Assignee: Sandisk Technologies Inc., Plano, TX (US)

(*) Notice: Subject to any disclaimer, the term of this patent is extended or adjusted under 35 U.S.C. 154(b) by 76 days.

(21) Appl. No.: 13/542,958

(22) Filed: Jul. 6, 2012

(65) Prior Publication Data

US 2014/0013187 A1    Jan. 9, 2014

(51) Int. Cl.  
*G11C 29/00* (2006.01)

(52) U.S. Cl.  
USPC .......................................... 714/773; 714/734

(58) Field of Classification Search  
USPC .......................................... 714/773, 734, 11  
See application file for complete search history.

(56) References Cited

U.S. PATENT DOCUMENTS

| 4,578,535 | A | * | 3/1986 | Simmons | ................... | 379/93.25 |
| 5,481,670 | A | * | 1/1996 | Hatashita et al. | ............ | 714/6.32 |
| 7,111,111 | B2 | | 9/2006 | Neuman et al. | | |
| 7,646,230 | B2 | * | 1/2010 | Parfitt | ........................... | 327/265 |
| 7,904,665 | B2 | * | 3/2011 | Watanabe | ...................... | 711/146 |
| 8,037,468 | B2 | | 10/2011 | Mosek | | |
| 2008/0320192 | A1 | * | 12/2008 | Chinthamani et al. | ........ | 710/113 |
| 2009/0150701 | A1 | | 6/2009 | Nagao et al. | | |
| 2010/0115181 | A1 | | 5/2010 | Tillgren | | |

OTHER PUBLICATIONS

Cromar, Scott. "Enterprise Servers and Storage," Office of Information Technology, Princeton University, from "The Solaris Troubleshooting Handbook", 2011, 17 pages.  
Zheng, Hongzhong et al. "Decoupled DIMM: Building High-Bandwidth Memory System Using Low-Speed DRAM Devices," ISCA '09, Jun. 20-24, 2009, Austin, TX, pp. 255-266.  
International Search Report and Written Opinion received from the International Searching Authority (EPO) for International Application No. PCT/US2013/046496, dated Oct. 9, 2013, 7 pages.

* cited by examiner

*Primary Examiner* — Fritz Alphonse  
(74) *Attorney, Agent, or Firm* — Toler Law Group, PC

(57) ABSTRACT

A method includes receiving a request to read data at a data storage device from an external device. In response to determining that the data is in a first memory of the data storage device, a first read operation is initiated to read the data from the first memory and a response is sent to the external device. The response indicates an error correction code (ECC) error. A read latency of the first read operation exceeds a reply time period corresponding to the request. The response is sent prior to completion of the first read operation and within reply time period.

27 Claims, 4 Drawing Sheets

USING SLOW RESPONSE MEMORY DEVICE ON A FAST RESPONSE INTERFACE

FIELD OF THE DISCLOSURE

The present disclosure is generally related to transferring data via a fast response interface.

BACKGROUND

Non-volatile data storage devices, such as universal serial bus (USB) flash memory devices or removable storage cards, have allowed for increased portability of data and software applications. Flash memory devices can enhance data storage density by storing multiple bits in each flash memory cell. For example, Multi-Level Cell (MLC) flash memory devices provide increased storage density by storing 3 bits per cell, 4 bits per cell, or more.

Other types of memory devices such, as dynamic random access memory (DRAM), may be used to store and retrieve data with a relatively high speed as compared to flash memory devices. For example, synchronous DRAM devices may communicate with a processor via a double data rate (DDR)-type interface according to a protocol that specifies a time period (e.g. a number of cycles) for the memory to return requested data after receiving a request for the data. While DRAM devices provide relatively high-speed operation, flash memory devices typically provide larger storage capacity and lower cost of manufacture. However, flash memory devices may not be able to consistently satisfy response times specified by a DDR interface protocol.

SUMMARY

A data storage device that includes a memory with a relatively slow response time can communicate with an external processing system via an interface that uses a relatively fast response time period. When the data storage device receives a request for data that is stored in the memory, such as a flash memory, the data storage device satisfies a response time of the interface by sending a response that indicates that an error correction coding (ECC) error has occurred. A processing system can be coupled to the data storage device and may include an interrupt handler that can determine whether the ECC error is authentic or whether the response indicating the ECC error is being used to compensate for the relatively slow response time of the memory. Upon determining that the ECC error is not authentic, the processing system may repeat the request for data upon expiration of a delay period.

DETAILED DESCRIPTION

Figure 1:
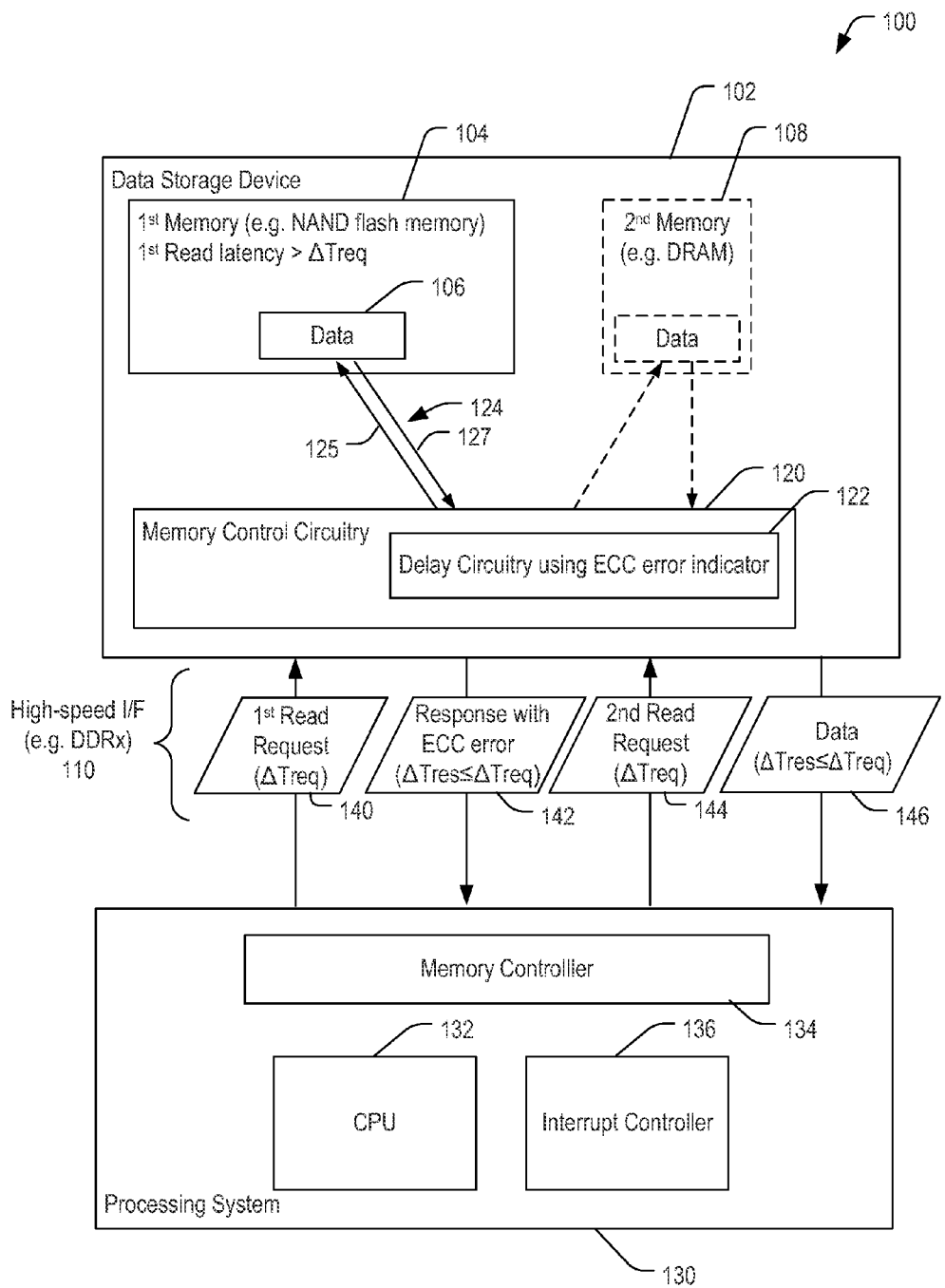
FIG. 1 is a block diagram of a particular illustrative embodiment of a system including a data storage device configured to use a relatively slow response memory and a relatively fast response interface.

FIG. 1 depicts a particular illustrative embodiment of a system 100 that includes a data storage device 102 configured to use a relatively slow response memory and a relatively fast response interface. The system 100 includes the data storage device 102 coupled to a processing system 130 via a high-speed interface 110. The data storage device 102 includes a first memory 104 that has a first read latency that is larger than a request response time limit of the high-speed interface 110. The data storage device 102 is configured to enable data reads from the first memory 104 via the high-speed interface 110 by providing responses within the request reply time limit of the high-speed interface 110 but that indicate error correction coding (ECC) errors. After retrieving requested data from the first memory 104, the requested data may be provided to the processing system 130 in response to a later-received request for the data and within the reply time period of the later request. In this manner, the data storage device 102 is responsive to the processing system 130 and compliant with timing requirements of the high-speed interface 110 by providing responses within required time periods, while data returned in the responses is indicated as erroneous to prevent processing errors at the processing system 130.

The data storage device 102 includes the first memory 104 memory control circuitry 120, and may include one or more other memories, such as a second memory 108. The first memory 104 may be a non-volatile memory, such as a NAND flash memory. The first memory 104 may have a larger storage capacity and a lower cost to manufacture as compared to the second memory 108, which may be a DRAM. The second memory 108 may have a read latency that satisfies reply time periods of the high-speed interface 110. To illustrate, the reply time period may correspond to a column access strobe (CAS) latency of a synchronous DRAM memory.

The memory control circuitry 120 is configured to receive a request from an external device, such as the processing system 130, to read data. For example, the memory control circuitry 120 is configured to receive a first read request 140 from the processing system 130. The first read request 140 may be a request to read data 106 that is stored at the first memory 104. The memory control circuitry 120 may be configured to identify which of one or more memories within the data storage device 102 stores the requested data. In response to determining that the requested data, such as the data 106, is stored in a memory (e.g. the first memory 104) that has a read latency that exceeds a reply time period corresponding to the first read request 140, the memory control circuitry 120 may be configured to initiate a first read operation 124 to read the data 106 from the first memory 104. For example, the first read operation 124 may include sending a command 125 to read the data 106 from the first memory 104 and a later response 127 that includes the data 106. The memory control circuitry 120 may also send a response 142 to the processing system 130. A latency ($\Delta$Tres) of sending the response 142 satisfies the reply time period ($\Delta$Treq). The response 142 indicates an error correction code (ECC) error.

For example, the memory control circuitry 120 may include delay circuitry 122 configured to generate an ECC error indicator. The delay circuitry 122 may be configured to generate the response 142 to include random data, pseudo-random data, or otherwise non-requested data and further includes an indication that an ECC error has occurred in the data provided in the response 142. As an example, the ECC error indicator may be a bit, a flag, or some other indicator within or accompanying the response 142 to indicate that a number of errors in the data provided with the response 142 has exceeded an ECC correction capability. As another example, the delay circuitry 122 may generate the response 142 with the ECC error by providing incorrect ECC parity bits that indicate a number of errors that exceeds the ECC correction capability upon decoding the provided data with the incorrect parity bits.

The memory control circuitry 120 may further be configured, after sending the response 142 and completing the first read operation 124, to store the data 106 to another memory that has a second read latency that satisfies a reply time period. For example, the memory control circuitry 120 may store the retrieved data 106 at the second memory 108 to be available to be retrieved within a second reply time period in response to receiving a second read request 144 for the data 106. In response to receiving the second read request 144, the memory control circuitry 120 may determine that the data 106 is in the second memory 108 and may retrieve the data 106 from the second memory 108 to be sent to the processing system 130. The data 106 may be sent to the processing system 130 as a data transmission 146 over the high-speed interface 110. Sending the data 106 via the data transmission 146 satisfies the required time period (i.e. ΔTres≤ΔTreq) of the second read request 144.

The high-speed interface 110 may be an interface configured to enable the processing system 130 to have relatively fast access to data at the data storage device 102. For example, the high-speed interface 110 may include a double data rate (DDR)-type interface. For example, the high-speed interface 110 may be a DDR interface, a DDR2 interface, or another version of a DDR interface. The high-speed interface 110 may enable data transfer according to a protocol where data is sent to the processing system 130 according to a set reply time period after a request is transmitted via the high-speed interface 110 to the data storage device 102. To illustrate, the high-speed interface 110 may include a memory bus and may support a protocol that specifies a number of cycles upon which data is to be read from the memory by the processing system 130 via the memory bus in response to the processing system 130 providing a request for the data.

The processing system 130 includes a memory controller 134, a central processing unit (CPU) 132, and an interrupt controller 136. The CPU 132 is configured to execute instructions. The CPU 132 may be an application processor or multi-processor core of a mobile electronic device. The CPU 132 may be configured to execute applications that may generate requests to read data from a particular memory address or to write data to a particular memory address. Such requests may be provided to the memory controller 134 to initiate data transfer to or from the data storage device 102.

The memory controller 134 is configured to be coupled to the data storage device 102 via the high-speed interface 110. The memory controller 134 is configured to send a request such as the first read request 140 to the data storage device 102 for read access to data. The memory controller 134 is further configured to receive a response from the data storage device 102, such as the response 142 with the ECC error indication. The memory controller 134 may be configured to signal an interrupt event to the interrupt controller 136 in response to determining that the response 142 indicates an ECC error.

The interrupt controller 136 is configured to respond to interrupt events, such as an interrupt event signaled by the memory controller 134 in response to an ECC error. The interrupt controller 136 may latch information corresponding to interrupt events and send a signal to the CPU 132 indicating one or more interrupt events. A signal received at the CPU 132 from the interrupt controller 136 may cause the CPU 132 to launch an interrupt handler that reads latched interrupt information from the interrupt controller 136 and that executes instructions corresponding to the interrupt event.

For example, the interrupt handler responsive to an ECC error interrupt event may be configured to introduce a delay period that may correspond to a first read latency of the first memory 104. For example, the interrupt handler at the CPU 132 may execute processing instructions to cause a process that requested the data 106 to delay for sufficient time to enable retrieval of the data 106 from the first memory 104. Upon expiration of the delay period, the interrupt handler may be configured to enable a subsequent request, such as the second read request 144, to be sent to the memory controller 134 for read access to the data 106.

In some implementations, the interrupt handler executed at the CPU 132 may be configured to determine whether receipt of the requested data 106 is delayed due to the first read latency of the first memory 104. For example, upon retrieving latched data from the interrupt controller 136 corresponding to the interrupt event from the memory controller 134, the interrupt handler may apply one or more techniques to determine whether the ECC error indicated in the response 142 is an authentic ECC error or is a "dummy" error designed to compensate for the first read latency 104 while complying with the response requirements of the high-speed interface 110. Such techniques are described in further detail with respect to FIGS. 2-3.

The interrupt handler, upon determining that the ECC error of the response 142 is not authentic, may introduce a delay period and, upon expiration of the delay period, may cause a subsequent read request, such as the second read request 144, to be sent. However, in other implementations, the interrupt handler may not directly determine whether the ECC error is authentic and may instead be configured to automatically introduce one or more delay periods and trigger subsequent request for data. Upon repeated ECC failures occurring in response to subsequent read requests, the interrupt handler may treat the data 106 as unusable and may terminate the process within the processing system 130 that requested the data 106.

During operation, a process within the processing system 130, such as a process executing at the CPU 136, may generate a request for the data 106. The request for the data 106 may be sent to the memory controller 134 and provided as the first read request 140 via the high-speed interface 110. In response to receiving the first read request 140, the memory control circuitry 120 may determine that the data 106 is located in the first memory 104 having the first read latency that exceeds a reply time period of the first read request 140. The memory control circuitry 120 may initiate the first read operation 124 to retrieve the data 106 and may also generate dummy data, such as by generation of random data or use of a data pattern (e.g. all 0's or all 1's).

During the reply time period of the first read request 140, the memory control circuitry 120 provides the response 142 via the high-speed interface 110 including the dummy data and further including an ECC error indicator, such as a set of ECC parity bits that, when decoded with the dummy data, indicate that a number of errors in the data exceeds a correction capability of the ECC scheme used at the processing system 130. The processing system 130 receives the response 142 via the high-speed interface 110. The memory controller 134 detects the ECC error indicator and signals an ECC error event to the interrupt controller 136.

The interrupt controller 136 may signal the interrupt event to the CPU 132 to cause the CPU 132 to launch an interrupt handler corresponding to the ECC error event. The CPU 132 may interrupt the process that requested the data 106 and may determine whether to send a subsequent request or whether to terminate the process (e.g. upon determining that the ECC error is authentic). The CPU 132 may cause a timer to be set according to a delay time period and upon expiration of the delay time period, the CPU 132 may cause the memory controller 134 to send the second read request 144 to retrieve the data 106. In other implementations the interrupt handler at the CPU 132 may determine that a delay time period has elapsed without use of a timer. For example, the CPU 132 may send the second request 144 in response to detection of a period of relative inactivity at the high-speed interface 110.

Prior to receiving the second read request 144, the memory control circuitry 120 may receive the data 106 via the first read operation 124 and may send the data 106 to be stored at the second memory 108. Upon receipt of the second read request 144, the memory control circuitry 120 may determine which of the memories of the data storage device 102 stores the data 106 and, upon determining the data 106 is stored at the second memory 108, the memory control circuitry 120 may initiate a second data retrieval operation to retrieve the data 106 from the second memory 108.

Because the second memory 108 has a read latency that does not exceed the reply time period of the second read request 144, the memory control circuitry 120 may send the data transmission 146 including the data 106 in compliance with the reply time period of the second read request 144. Upon receiving the data transmission 146 and determining that no ECC error is indicated associated with the data transmission 146, the memory controller 134 may provide the received data to the process that requested the data 106.

Operation of the delay circuitry 122 therefore enables a relatively large capacity, low cost memory to appear responsive to the reply time periods for communications via the high-speed interface 110 without causing processing failures to occur at the processing system 130. The interrupt handler executed within the processing system 130 may be configured to intelligently handle ECC errors indicated in response to requests for data to enable data to be retrieved from the first memory 104, as described in further detail with respect to FIG. 3.

Figure 2:
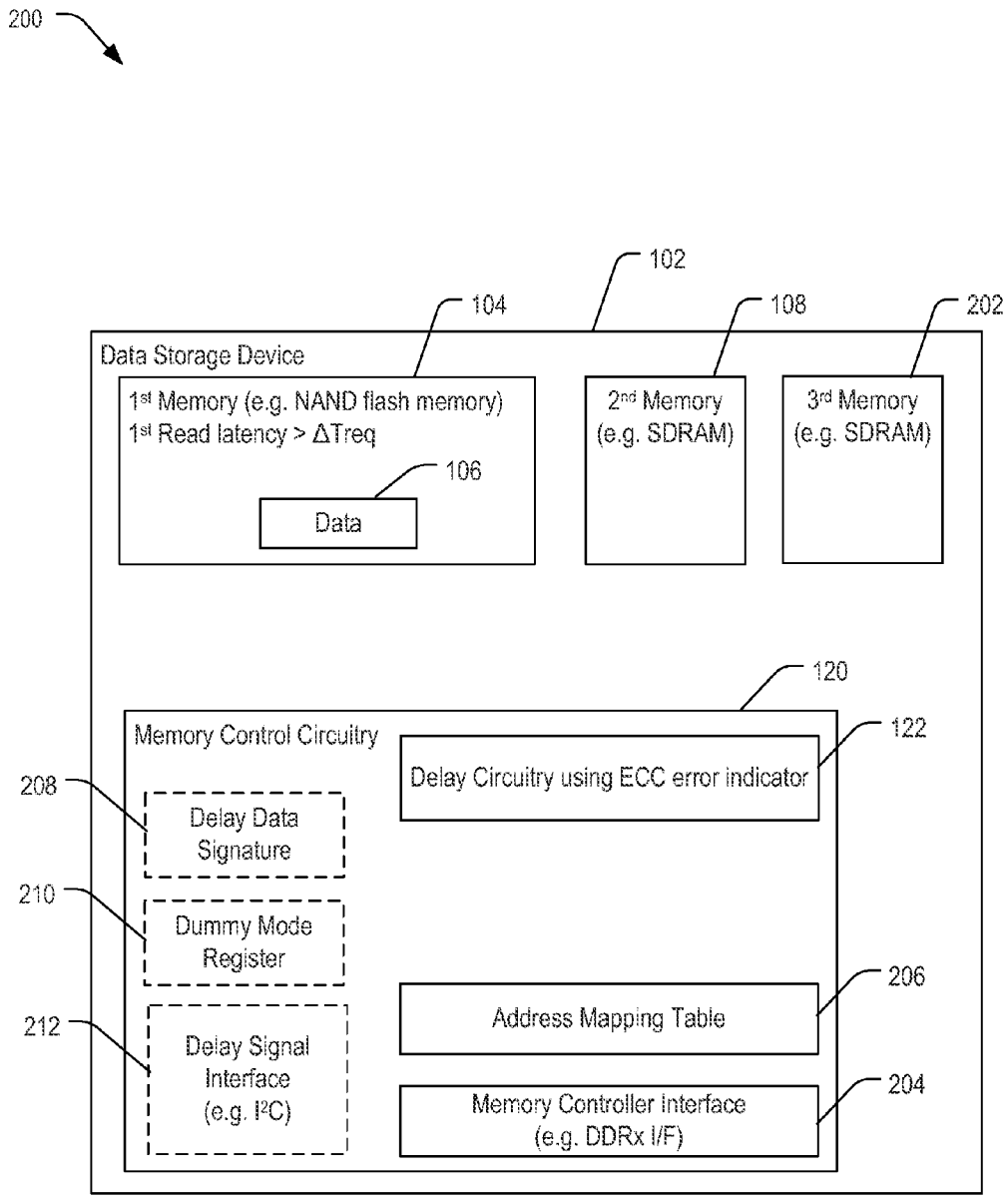
FIG. 2 is a block diagram illustrating a particular embodiment of components that may be incorporated in the data storage device of FIG. 1.

Referring to FIG. 2, an illustration of a particular embodiment of components that may be incorporated into the data storage device 102 of FIG. 1 is depicted and generally designated 200. The data storage device 102 includes the first memory 104, the second memory 108, and a third memory 202. The second memory 108 and the third memory 202 may be relatively high-speed memories as compared to the first memory 104. For example, the first memory 104 may be a flash memory, such as a NAND flash memory, and the second memory 108 and the third memory 202 may each be a DRAM-type memory, such as a synchronous DRAM (SDRAM) memory. Although a single memory having a relatively large read latency (i.e. the first memory 104) and two relatively high-speed memories (i.e. the second memory 108 and the third memory 202) are illustrated in FIG. 2, it should be understood that the data storage device 102 may include any number of relatively low-speed memories and may also include any number of relatively high-speed memories.

The memory control circuitry 120 includes the delay circuitry 122. The memory control circuitry 120 also includes an address mapping table 206 and a memory controller interface 204. The memory controller interface 204 may be configured to enable the data storage device 102 to receive and send data via a high-speed interface, such as the high-speed interface 110 of FIG. 1. For example, the memory controller interface 204 may be a double data rate-type interface (DDRx I/F).

The address mapping table 206 may include a table or other data structure that associates addresses of requested data received by the memory controller interface 204 to one or more of the memories 104, 108, and 202. For example, the memory control circuitry 120 may be configured to receive a request for the data 106 and to access the address mapping table 206 to determine which memory of the data storage device (as illustrated, the first memory 104) stores the requested data 106.

In some implementations, the memory control circuitry 120 may include a delay data signature 208. For example, the delay circuitry 122 may be configured to signal, via the delay data signature 208, that a response to a read request indicates an ECC error but that the ECC error is used to compensate for relatively large latency of data retrieval from the first memory 104. To illustrate, the delay data signature 208 may include a pattern of data that is unlikely or unpermitted to be used as valid data, such as by setting some particular values of reserved bits of the response 142 of FIG. 1. As another example, the delay data signature 208 may include a data pattern and/or a parity bit pattern that is very likely to occur during normal processing. For example, the delay data signature 208 may include a data pattern of all 0 values and a set of parity bits that includes all 1 values. The delay data signature 208 may be selected to be identifiable by an interrupt handler of the receiving device, such as the processing system 130 of FIG. 1, to recognize a response that includes the delay data signature 208 as a delay response rather than an authentic ECC error response.

In another particular implementation, the memory control circuitry 120 may emulate a "dummy" mode register 210. For example, the memory control circuitry 120 may support, via the memory controller interface 204, a register access request from the processing system 130 of FIG. 1 to access the dummy mode register 210. In response to receiving a request to access the dummy mode register 210, the memory control circuitry 120 may provide information indicating whether a previously sent response indicating an ECC error constitutes an authentic ECC error or a delaying response to mask the first read latency of the first memory 104. For example, in response to receiving the request 140 of FIG. 1 to retrieve the data 106 that is stored at the first memory 104, the memory control circuitry 120 may provide the response 142 of FIG. 1 indicating the ECC error. Upon receiving the response 142, the processing system 130 of FIG. 1 may instruct the data storage device 102 to provide contents of the dummy mode register 210. In response to receiving the instruction to read the contents of the dummy mode register 210, the memory control circuitry 120 may provide an indication of whether the data 106 included an authentic ECC error upon retrieval or whether retrieval of the data 106 is not complete.

In another implementation, the memory control circuitry 120 may support a delay signal interface 212. For example, the delay signal interface 212 may correspond to an inter-integrated circuit ($I^2C$)-type signaling interface or one or more other general purpose or dedicated signaling lines that may be used to send an indication from the data storage device 102 to the processing system 130 indicating whether or not an ECC error is authentic. For example, the delay signal interface 212 may include a signaling line that carries a first signal (e.g. a logic low voltage) from the memory control circuitry 120 to the processing system 130 to indicate that an ECC error is authentic and that carries a second signal (e.g. a logic high voltage) to indicate that the ECC error is not authentic.

Figure 3:
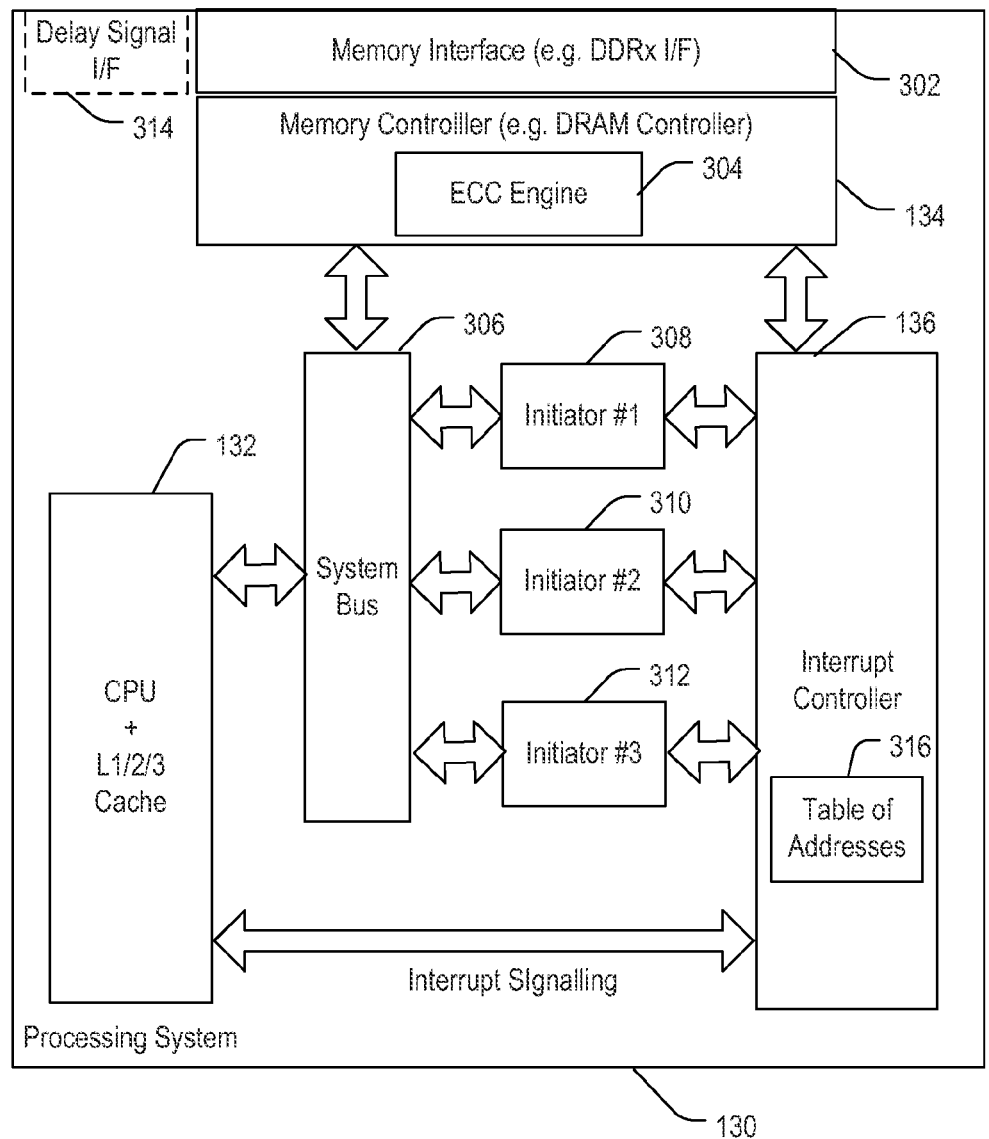
FIG. 3 is a block diagram illustrating a particular embodiment of components that may be incorporated in the processing system of FIG. 1.

FIG. 3 illustrates a particular embodiment of components that may be incorporated in the processing system 130 of FIG. 1. The processing system 130 is illustrated as including a memory interface 302, the memory controller 134, the interrupt controller 136, and the CPU 132. The memory interface 302 enables the processing system 130 to send and receive messages via the high-speed interface 110 of FIG. 1. For example, the memory interface 302 may be a DDR-type interface. The memory controller 136 is coupled to communicate with the CPU 132 and with a first initiator 308, a second initiator 310, and a third initiator 312 via a system bus 306. Each of the initiators 308-312 is configured to communicate with the interrupt controller 136. In addition, the interrupt controller 136 is configured to communicate an interrupt signal with the CPU 132 via a communication channel that bypasses the system bus 306.

The memory controller 134 may operate as described with respect to FIG. 1. Further, the memory controller 134 is illustrated as including an ECC engine 304. The ECC engine 304 may be configured to receive data to be stored at the data storage device 102 and to generate a codeword. For example, the ECC engine 304 may include an encoder configured to encode data using an ECC encoding scheme, such as a Reed Solomon encoder, a Bose-Chaudhuri-Hocquenghem (BCH) encoder, a low-density parity check (LDPC) encoder, a Turbo Code encoder, an encoder configured to encode one or more other ECC encoding schemes, or any combination thereof. The ECC engine 304 may include a decoder configured to decode data read from the memory 104 to detect and correct, up to an error correction capability of the ECC scheme, any bit errors that may be present in the data. In response to a number of errors exceeding the error correction capability, the ECC engine 304 may be configured to provide an indication of an ECC decoding failure (i.e. an ECC error) to the memory controller 134.

The CPU 132 may be a processing unit, such as a single or multi-core processor and may include one or more levels of cache memory, such as an L1, L2, and/or L3 cache memory. For example, the processing system 130 may be implemented in a portable electronic device such as a mobile phone or a tablet, and the CPU 132 may include an application processor, a graphical processing unit, a digital signal processor, one or more other processing components, or any combination thereof.

The initiators 308-312 may include one or more components that are configured to initiate a memory access request. For example, the initiators 308-312 may include a direct memory access (DMA) controller, a serial advanced technology attachment (SATA) controller, an embedded memory device controller such as an embedded multimedia card (eMMC) controller, one or more other components that may initiate a memory access request, or any combination thereof.

The interrupt controller 136 may be responsive to any one of the initiators 308-312 and the CPU 132. The interrupt controller 136 may be configured to receive interrupt event signals and to send an interrupt signal to the CPU 132 to cause the CPU 132 to initiate execution of one or more interrupt handlers in response to interrupt events. For example, the interrupt controller 136 may be configured to receive an interrupt event signal corresponding to an ECC error detected by the memory controller 134 and to cause the CPU 132 to execute an interrupt handler to interrupt a process that requested the data associated with the ECC error. The interrupt handler may be configured to store a state of a process that requested the data. The interrupt handler may set one or more timers that are configurable to indicate expiration of a delay period, such as a delay period that corresponds to the first read latency of the first memory 104 of FIG. 1. The interrupt controller 136 may be configured to receive an interrupt event signal corresponding to a signal from a timer indicating expiration of the delay period. The interrupt controller 136 may send a signal to the CPU 132 to cause the interrupt handler to, upon expiration of the delay period, send a subsequent request to the memory controller 134 for read access to the data.

The interrupt handler executed CPU 132 may have access to a table of addresses 316 in the interrupt controller 136 and may be configured to access the table of addresses 316 to determine whether an ECC error is authentic. For example, the table of addresses 316 may include a table or other data structure that identifies memory addresses that are mapped to relatively slow response memories within an external data storage device that is coupled to the memory interface 302. To illustrate, the table of addresses 316 may indicate addresses or one or more range of addresses of data that is stored in the first memory 104 of the data storage device 102. Upon receipt of an interrupt event signal triggered by an ECC error at the memory controller 134, the interrupt handler may access the table of addresses 316 to determine whether the data associated with the ECC error is stored in a relatively slow response memory. If the data is stored in a relatively slow response memory, the interrupt handler may delay a process that requested the data or end the process and to re-start the process after a delay time period has elapsed (i.e. to respond to the interrupt as if the ECC error is not authentic). If the table of addresses 316 indicates that the data is not stored in a relatively slow response memory, the interrupt handler may be configured to terminate the process (i.e. to respond to the interrupt as if the ECC error is authentic). Although the table of addresses 316 is illustrated within the interrupt controller 136, in other embodiments the table of addresses 316 may be external to the interrupt controller 136, such as coupled to or implemented within the memory controller 134.

Figure 4:
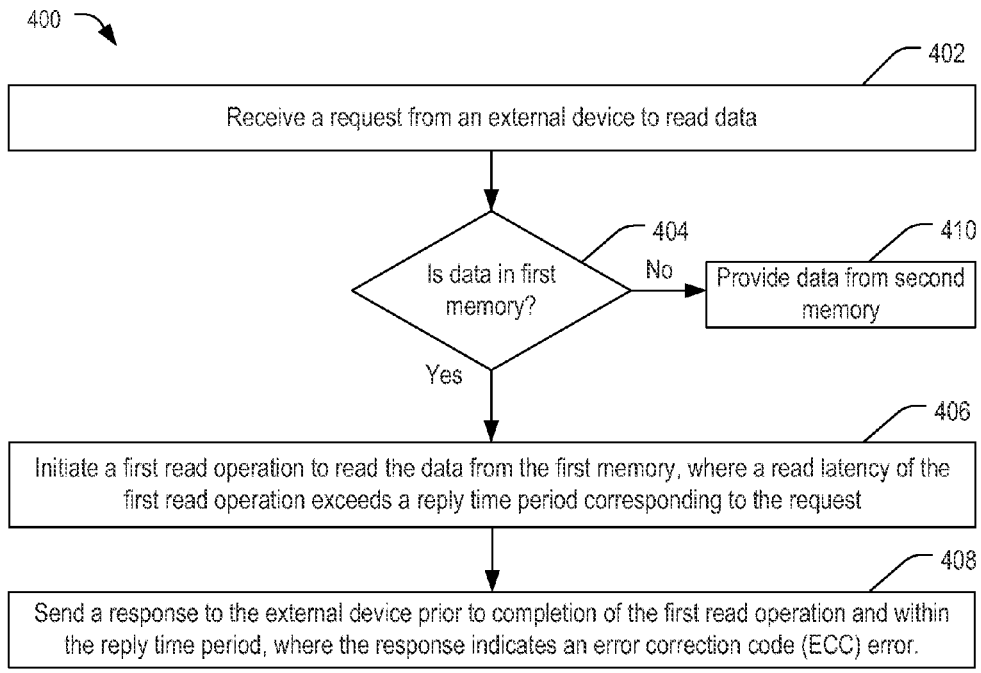
FIG. 4 is a flow chart of a particular illustrative embodiment of a method of that may be performed by the data storage device of FIG. 1.

FIG. 4 depicts a particular illustrative embodiment of a method 400 of using a relatively slow-response memory with a relatively fast-response interface. The method 400 may be performed by a data storage device that includes a first memory, such as the data storage device 102 of FIG. 1, while the data storage device is operatively coupled to an external device, such as the processing system 130 of FIG. 1.

A request is received from the external device to read data, at 402. For example, the request may correspond to the first read request 140 of FIG. 1 that is received at the data storage device 102 via the high-speed interface 110.

A determination is made whether the data is in the first memory, at 404. For example, the memory control circuitry 120 may perform a table lookup operation using the address mapping table 206 of FIG. 2 to determine whether an address of the requested data is mapped to the first memory 104 or to another memory of the data storage device 102 (e.g. the second memory 108 or the third memory 202).

In response to determining that the data is in the first memory, at 404, a first read operation is initiated to read the data from the first memory, at 406. A read latency of the first read operation exceeds a reply time period corresponding to the request. For example, the first memory 104 of FIG. 1 may have a first memory latency that exceeds a reply request time ($\Delta Treq$) of the high-speed interface 110. In addition, a response is sent to the external device, at 408. The response is sent prior to completion of the first read operation and within the reply time period and the response indicates an error correction code (ECC) error. For example, the response may be the response 142 of FIG. 1.

The data storage device may further include a second memory having a second read latency that satisfies the reply time period, such as the second memory 108 of FIG. 1. The data may be stored in the second memory after retrieving the data from the first memory and after sending the response indicating the ECC error. To illustrate, the first memory may be a flash memory and the second memory may be a synchronous dynamic random access memory (SDRAM). The request may be received at the data storage device via a DRAM interface, and the reply time period may correspond to a column access strobe (CAS) latency. In response to determining that the data is not in the first memory, such as accessing the address mapping table 206 of FIG. 2 to determine that the data is in the second memory 108, the data may be retrieved from the second memory and sent to the external device, at 410. Sending the data retrieved from the second memory satisfies the reply time period of the subsequent request.

By sending the response that satisfies the reply time period of the first request, the data storage device may comply with a latency characteristic indicated by a fast-response interface, such as a DDR-type interface. However, because the requested data may not be available when the response is sent, non-requested data (e.g. random data or a specified data pattern) may be sent indicating an ECC error to prevent the data from being used. A processing system receiving such a response may be able to re-request the data after a sufficient time period has elapsed to enable the data to be retrieved, such as described with respect to FIG. 5.

Figure 5:
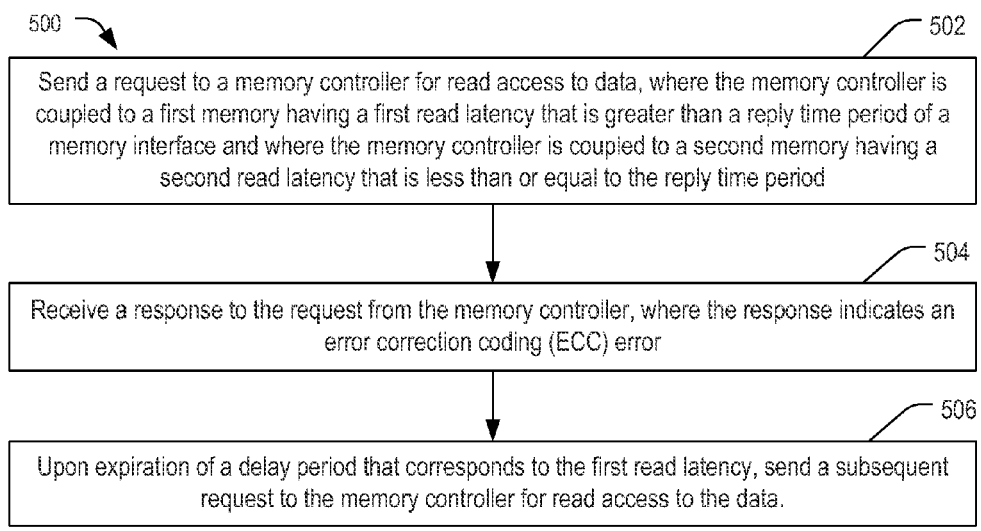
FIG. 5 is a flow chart of a particular illustrative embodiment of a method of that may be performed by the processing system of FIG. 1.

FIG. 5 depicts a particular illustrative embodiment of a method 500 that may be performed by a processing system, such as the processing system of FIG. 1, coupled to a data storage device. A request is sent to a memory controller for read access to data, at 502. The memory controller (e.g. the memory controller 134 of FIG. 1) is coupled to a first memory (e.g. coupled to the first memory 104 of FIG. 1 via the memory control circuitry 120) having a first read latency that is greater than a reply time period of a memory interface (e.g. the memory interface 302 of FIG. 3) and is further coupled to a second memory (e.g. coupled to the second memory 108 of FIG. 1) having a second read latency that is less than or equal to the reply time period.

A response to the request from the memory controller is received, at 504. The response indicates an error correction coding (ECC) error. For example, the response may be the response 142 of FIG. 1.

Upon expiration of a delay period, a subsequent request is sent to the memory controller for read access to the data, at 506. For example, an interrupt event may be signaled at the interrupt controller 136 of FIG. 1 in response to detecting the ECC error of the response 142. The interrupt event may cause an interrupt handler to interrupt a process that requested the data and to detect an expiration of the delay period, such as by detecting expiration of a delay period timer. For example, the process may correspond to a process at the CPU 132 or at one of the initiators 308-312 of FIG. 3.

The interrupt handler may cause a state of the process to be stored. After storing the state of the process, the interrupt handler may cause the process to be terminated. Upon expiration of the delay period, the interrupt handler may cause the process to be re-run. For example, re-running the process may cause a subsequent request for the data to be sent, such as the second read request 144 of FIG. 1 that is sent to the data storage device 102. The interrupt handler may enable another process to be run during the delay period, such as another process that may be executing at the CPU 132 according to a multi-threaded and/or multi-processor operation, to reduce or prevent stalling execution of the other process during the delay period.

In some embodiments, the interrupt handler may interrupt the process and initiate the delay period without determining whether the ECC error is authentic. For example, the interrupt handler may cause the CPU 132 of FIG. 1 to continue delaying and re-running a process until the data is returned without an ECC error or until a count of responses that indicate an error equals a threshold. For example, the processing system 130 of FIG. 1 may be configured to re-send requests for the data until three consecutive requests for the data have resulted in responses indicating ECC errors. After the threshold has been reached, the interrupt handler may terminate the process.

In other embodiments, the subsequent request is sent to the memory controller conditioned on a determination that the receipt of the data is delayed due to the first read latency. For example, the determination may be based on accessing a table of physical addresses, such as the table of addresses 316 of FIG. 3, to determine whether the requested data is in a relatively slow-response memory, such as the first memory 104.

As another example, the determination may be based on receiving a signal from the data storage device. To illustrate, the signal may be received via the delay signal interface 314 of FIG. 3. The signal may be provided according to an I²C mechanism, as one illustrative example, or may be provided via a general purpose signaling line or dedicated signaling line, as other illustrative examples. As another example, the determination may be based on reading a dummy mode register name, such as described with respect to the dummy mode register 210 of FIG. 2.

As a further example, the determination may be based on a comparison of data received in the response to a data signature. For example, receiving data having all 0 values and ECC parity bits having all 1 values may be identified by the interrupt controller 136 of FIG. 1 as indicating that the ECC error indication is not authentic. In response, the interrupt controller 136 may cause the processing system 130 to send a second request for the data after expiration of a delay period to provide the data storage device 102 with sufficient time to retrieve the data from the first memory 104.

Although various components depicted herein are illustrated as block components and described in general terms, such components may include one or more microprocessors, state machines, or other circuits configured to enable the data storage device 102 of FIG. 1 to send a response indicating an ECC error when a request is received for data in a memory (such as the first memory 104) that cannot be retrieved in time to satisfy a reply time limit of the request. For example, the memory control circuitry 140 may represent physical components, such as hardware controllers, state machines, logic circuits, or other structures, to enable the memory control circuitry 140 of FIG. 1 to determine whether requested data is retrievable within the reply time of the request, such as by accessing the address mapping table 206 of FIG. 2, and in response to determining that the requested data is not retrievable within the reply time limit (e.g. determining that the data is stored in the first memory 104), to send a response within the reply time limit that includes dummy data and that indicates an ECC error.

Although described as circuitry in FIG. 1, the memory control circuitry 140 may be implemented using a microprocessor or microcontroller programmed to determine whether requested data is retrievable within the reply time period of the request, such as by accessing the address mapping table 206 of FIG. 2, and in response to determining that the requested data is not retrievable within the reply time period (e.g. determining that the data is stored in the first memory 104), to send a response within the reply time period that includes dummy data and that indicates an ECC error. In a particular embodiment, the memory control circuitry 140 includes a processor executing instructions that are stored at the first memory 104. Alternatively, or in addition, executable instructions that are executed by the processor may be stored at a separate memory location that is not part of the first memory 104, such as at a read-only memory (ROM).

In a particular embodiment, the data storage device 102 may be implemented in a portable device configured to be selectively coupled to one or more external devices. However, in other embodiments, the data storage device 102 may be attached or embedded within one or more host devices, such as within a housing of a host communication device. For example, the data storage device 102 may be within a packaged apparatus such as a wireless telephone, a personal digital assistant (PDA), a gaming device or console, a portable navigation device, or other device that uses internal non-volatile memory. In a particular embodiment, the data storage device 102 may be coupled to or include a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, at a data storage device, a request from an external device to read data, wherein the data storage device includes a first memory; and
   in response to determining that the data is in the first memory:
      initiating at the data storage device a first read operation to read the data from the first memory, wherein a read latency of the first read operation exceeds a reply time period corresponding to the request; and
      sending from the data storage device a response to the external device prior to completion of the first read operation and within the reply time period, wherein the response indicates an error correction code (ECC) error.

2. The method of claim 1, wherein the data storage device further includes a second memory having a second read latency that satisfies the reply time period.

3. The method of claim 2, wherein the first memory is a flash memory, wherein the second memory is a synchronous dynamic random access memory (SDRAM), wherein the request is received at the data storage device via a DRAM interface, and wherein the reply time period corresponds to a column access strobe (CAS) latency of the SDRAM.

4. The method of claim 2, further comprising, in response to determining that the data is in the second memory, retrieving the data from the second memory and sending the data to the external device.

5. The method of claim 2, further comprising storing the data in the second memory after retrieving the data from the first memory and after sending the response indicating the ECC error.

6. The method of claim 1, wherein the first memory includes a three-dimensional (3D) memory.

7. The data storage device of claim 1, wherein the first memory includes a three-dimensional (3D) memory.

8. A data storage device comprising:
   memory control circuitry;
   a first memory responsive to the memory control circuitry; and
   a controller interface,
   wherein in response to receiving, via the controller interface, a request to read data that is determined by the memory control circuitry to be stored in the first memory, the memory control circuitry is configured to:
      initiate a first read operation to read the data from the first memory, wherein a read latency of the first read operation exceeds a reply time period corresponding to the request, and
      send a response via the controller interface to an external device during the reply time period, wherein the response indicates an error correction code (ECC) error.

9. The data storage device of claim 8, further comprising a second memory having a second read latency that satisfies the reply time period.

10. The data storage device of claim 9, wherein the first memory is a flash memory, wherein the second memory is a synchronous dynamic random access memory (SDRAM), wherein the controller interface is a DRAM interface, and wherein the reply time period corresponds to a column access strobe (CAS) latency of the SDRAM.

11. The data storage device of claim 9, wherein the memory control circuitry is configured, in response to determining that the data is in the second memory, to retrieve the data from the second memory and to send the data via the controller interface to the external device.

12. The data storage device of claim 9, wherein after retrieving the data from the first memory and after sending the response indicating the ECC error, the memory control circuitry is configured to store the data in the second memory.

13. A method comprising:
   sending a request to a memory controller for read access to data, wherein the memory controller is coupled to a first memory having a first read latency that is greater than a reply time period of a memory interface and wherein the memory controller is coupled to a second memory having a second read latency that is less than or equal to the reply time period;
   receiving a response to the request from the memory controller, wherein the response indicates an error correction coding (ECC) error; and upon expiration of a delay period, sending a subsequent request to the memory controller for read access to the data.

14. The method of claim 13, wherein an interrupt event is signaled at an interrupt controller in response to determining that the response indicates the ECC error and wherein the interrupt event causes an interrupt handler to interrupt a process that requested the data.

15. The method of claim 14, wherein the interrupt handler detects the expiration of the delay period.

16. The method of claim 14, wherein the interrupt handler causes a state of the process to be stored, terminates the process, and re-runs the process upon expiration of the delay period.

17. The method of claim 14, wherein the interrupt handler enables another process to be run during the delay period.

18. The method of claim 13, wherein the subsequent request is sent to the memory controller conditioned on a determination that the receipt of the data is delayed.

19. The method of claim 18, wherein the determination is based on accessing a table of physical addresses.

20. The method of claim 18, wherein the determination is based on receiving a signal, wherein the signal is received from a data storage device that includes the first memory and the second memory.

21. The method of claim 18, wherein the determination is based on reading a dummy mode register.

22. The method of claim 18, wherein the response includes response data and wherein the determination is based on a comparison of the response data to a data signature.

23. The method of claim 13, wherein the first memory includes a three-dimensional (3D) memory.

24. A processing system comprising:
a memory controller configured to be coupled to a data storage device that includes a first memory having a first read latency that is greater than a reply time period of a memory interface and that includes a second memory having a second read latency that is less than or equal to the reply time period;
a processor; and
an interrupt controller,
wherein the memory controller is configured to send a request to the data storage device for read access to data and to receive a response from the data storage device and wherein the memory controller is configured to signal an interrupt event to the interrupt controller in response to the response indicating an error correction coding (ECC) error, and
wherein the interrupt controller is configured to cause an interrupt handler to, upon expiration of a delay period, send a subsequent request to the memory controller for read access to the data.

25. The processing system of claim 24, wherein the first memory is a flash memory, wherein the second memory is a synchronous dynamic random access memory (SDRAM), wherein the memory controller is a double data rate (DDR)-type DRAM controller, and wherein the reply time period corresponds to a column access strobe (CAS) latency of the SDRAM.

26. The processing system of claim 24, wherein the processor includes a central processing unit (CPU).

27. The processing system of claim 24, wherein the first memory includes a three-dimensional (3D) memory.

* * * * *